(No Model.) 2 Sheets—Sheet 1.

W. L. FISH.
BICYCLE SADDLE.

No. 345,424. Patented July 13, 1886.

WITNESSES:   INVENTOR:
Fredk. F. Campbell   Warren L. Fish,
Horace Harris   BY Drake & Co., ATT'YS.

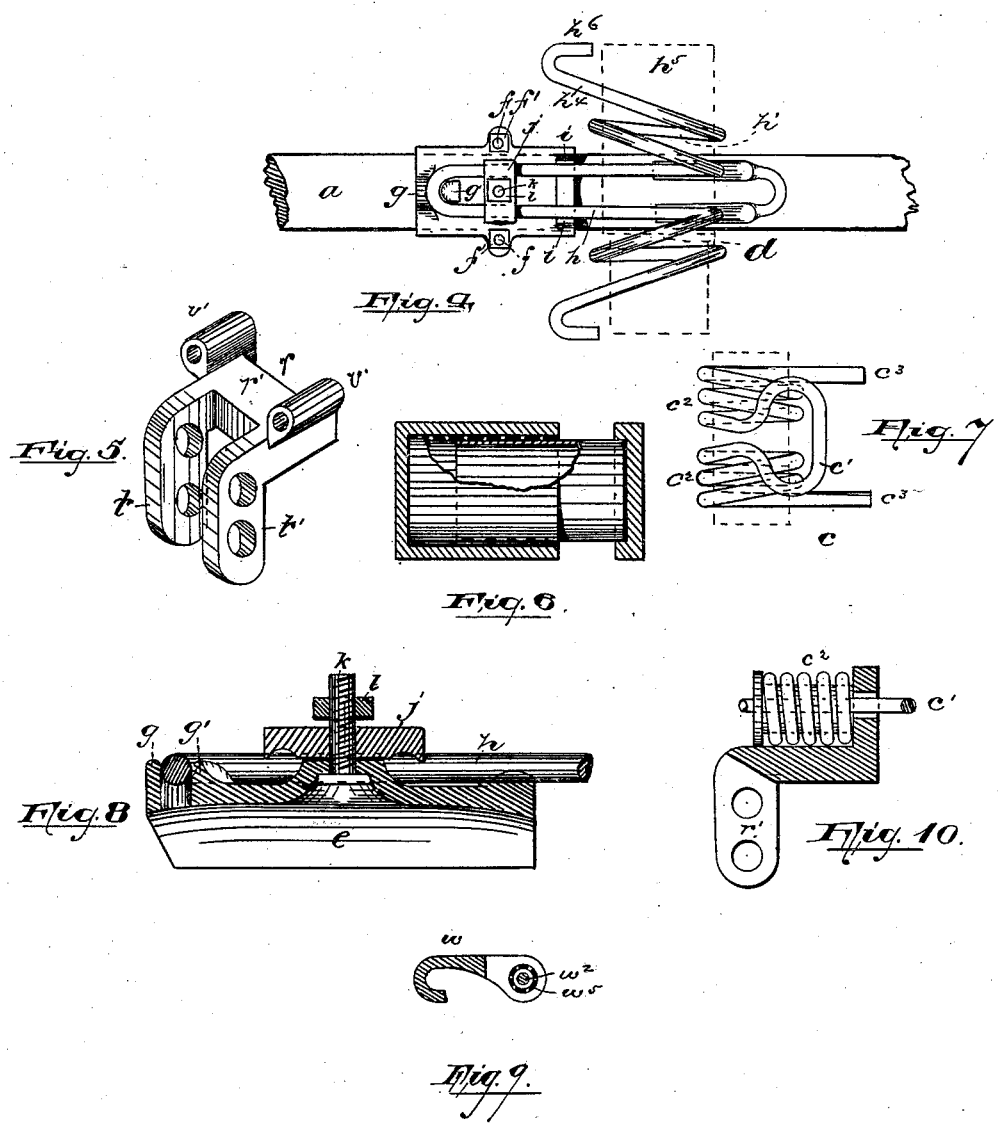

UNITED STATES PATENT OFFICE.

WARREN L. FISH, OF NEWARK, NEW JERSEY.

BICYCLE-SADDLE.

SPECIFICATION forming part of Letters Patent No. 345,424, dated July 13, 1886.

Application filed February 20, 1886. Serial No. 192,609. (No model.)

*To all whom it may concern:*

Be it known that I, WARREN L. FISH, a citizen of the United States, residing at Newark, in the county of Essex and State of New Jersey, have invented certain new and useful Improvements in Bicycles; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to secure increased ease in riding, to more readily and accurately readjust the saddle upon the perch or backbone without expending the time and care required by other allied devices, to secure increased strength and a more certain and secure adjustment of parts, and to gain other results and advantages, some of which will be hereinafter given in detail.

The invention consists in the combinations and arrangements of parts, substantially as will be hereinafter set forth, and finally embodied in the clauses of the claim.

Figure 1:
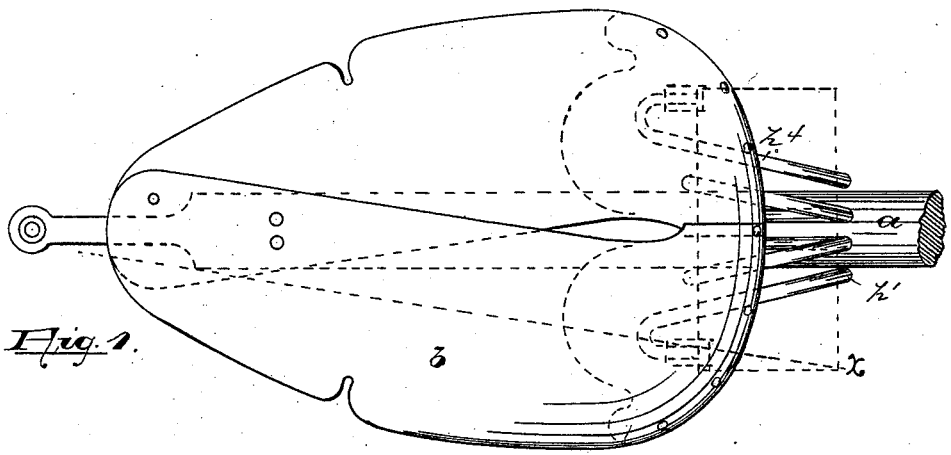
Figure 2:
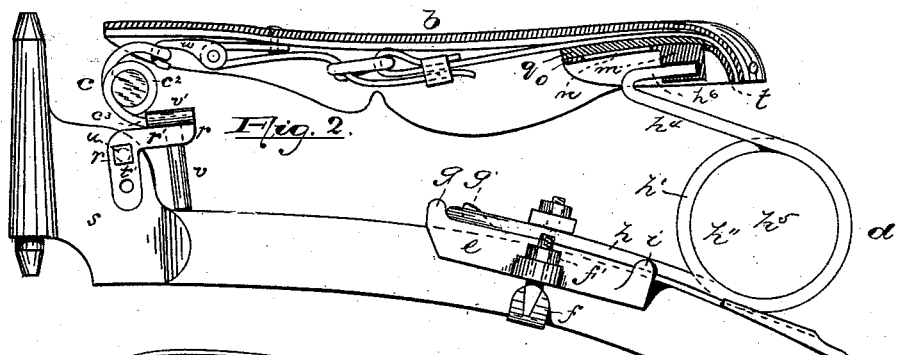
Figure 3:
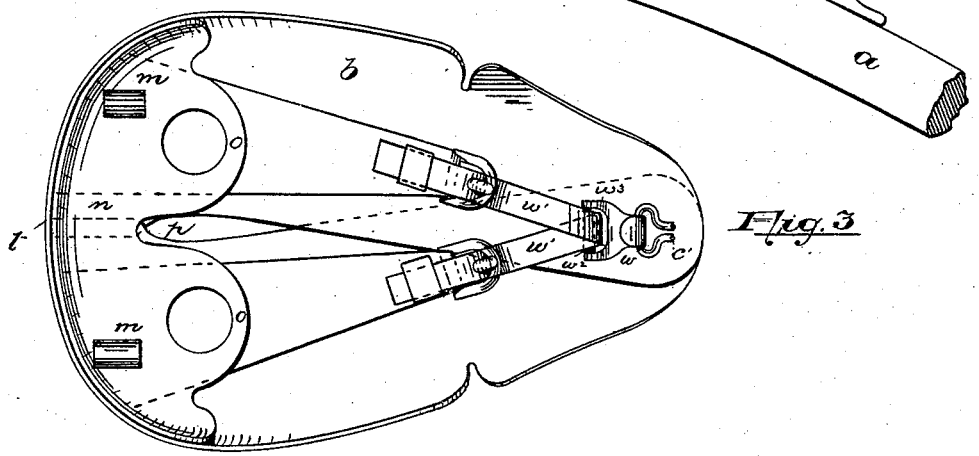

Referring to the accompanying drawings, embraced in two sheets, in which like letters indicate corresponding parts in each of the several figures, Figure 1, Sheet 1, is a plan of the improved saddle in connection with the perch or backbone of the bicycle. Fig. 2 is a side elevation of the same, and Fig. 3 is a bottom plan of the seat of the saddle. Fig. 4, Sheet 2, is a detail plan showing the connection and arrangement of the rear saddle-spring upon a seat or bearing-piece attached to the backbone or other bearing of the vehicle. Fig. 5 is a perspective view of a bearing, in detail, for the front saddle-spring. Fig. 6 is a view illustrating a cylindrical tool-box or bearing, to be used in connection with the rear spring. Fig. 7 is a plan of the preferred construction of the front spring. Fig. 8 is a sectional view of the seat or bearing-plate for the rear spring. Fig. 9 is a sectional view of a hook to be used in connection with an eye formed from the wire of the front spring, and Fig. 10 is a view illustrating a modification in the construction of the front spring and its bearings.

In said drawings, *a* indicates the backbone or perch of the bicycle or allied vehicle, which is of the ordinary construction, being curved over the large front wheel of the vehicle or arranged in any of the usual manners.

*b* is the saddle or seat, which is of flexible material, such as leather, and is suspended or stretched between front and rear springs, *c d*, although the front spring may be dispensed with and the saddle be attached to some other fixture of the said backbone or other portion of the frame of the bicycle or tricycle. The rear spring, *d*, has its lower bearing or base resting on a seat, *e*, attached to or formed on the backbone, being preferably secured upon said backbone by a clip, *f*, and nuts, *f'*, by which the said seat is permanently arranged in place—that is to say, it is not disturbed when the spring is adjusted in readjusting the saddle. Said seat is grooved longitudinally on the under side to receive the backbone, the surface of the groove *e'* being transversely rounded and longitudinally concaved, as shown in Fig. 8, to conform to the transverse rotundity and longitudinal bend or curve in the backbone. By means of this construction, when the seat is placed in position on the said backbone or perch, said seat is prevented from turning laterally on the said curved backbone, as will be apparent. The upper face or portion of the said seat is provided with suitable conformations, such as the abutments *g g'* and stays *i i*, between which the base of the spring rests. These prevent the spring from working longitudinally in either direction or laterally on the base, and enable the spring, when arranged on said seat, to be brought at once to a correct position without any care in adjusting.

Of the abutments *g g'*, I wish to lay especial claim to the first in its connection or relation to the peculiar spring. Said abutment *g* lies against the forwardly-projecting base *h* of the spring, and presents a positive obstruction to said base, preventing it from slipping in its bearings or working forward under the tension or forward pull of the saddle should a clamping plate or device extending across the base be a little loose. The base *h* of the spring, where the latter engages the above-described seat, is preferably held on said seat by a clamping-plate, *j*, which lies over said base, as in Figs. 2, 4, and 8. Said plate is in turn held in place by a bolt or stud, $k$, and nut $l$, the first of which preferably passes up through a perforation in the seat, the head thereof being held in a recess formed in the under side of said seat. Said bolt extends up through a perforation in the clamping-plate, and thus serves as a pivotal bearing for said plate, upon which the said plate may be turned to allow the removal of the spring without entirely removing the nut. The nut serves as one means of holding the clamping-plate in place.

In adjusting the spring $d$, and saddle attached thereto, upon the said seat, the said saddle is first pulled as tight as possible by the hand, and the end of the base $h$ brought into engagement with the forward abutment, $g$, which then serves as a fulcrum, the rear portions of the base being raised from the seat. The clamping-plate is then turned so as to cross the base, and the nut is screwed down. This action tends to give increased stiffness to the saddle, and renders the same more desirable for riding purposes. The spring $d$ is preferably of peculiar construction, and produces peculiar effects of movement of the saddle, so that the action of said saddle is more perfectly in accord with the movement of the body and limbs of the rider in working the treadle. The wire forming said spring is first doubled, as shown in Fig. 4, to form the base $h$. It is then bent to form coils $h'$ $h'$, the coils lying in a line, so as to form a cylindrical receptacle, $h''$, which lies at right angles to the line of the perch or backbone to receive the cylindrical strengthening-block $h^3$, which serves to prevent the wire of the spring from "setting" or being bent out of its proper position. Said block $h^3$ is preferably of hollow material covered with leather, rubber, or similar elastic material, to allow for and assist the spring action of the coil. The block may be of solid rubber, but is preferably hollow sheet metal, with the elastic covering described. In this form it may be, and preferably is, utilized as a tool-box or receptacle for other articles. The box may be of other construction, and be placed in the receptacle $h''$, and serve like purposes without departing from the invention. The box in one of its forms is shown in detail in Fig. 6, and in outline in connection with the spring in Fig. 4. After forming the coils the portions $h^4$ of the spring extend outwardly or laterally and forwardly, so as to obtain a wide separation of bearings, and the ends are then bent sharply or abruptly, or are returned, as at $h^6$, to enter suitable sockets, $m$, formed in the back plate, $n$, of the saddle, where the said ends are preferably permanently fastened, though the tension of the flexible portion of the said saddle would retain said ends in place. The plate $n$ holds the flexible portion of the seat in an expanded condition, so as to obtain suitable breadth of supporting-surface and ease resulting therefrom. Said plate is provided at its back edge with a depending perforated flange, $t$, over which the flexible portions are stretched and riveted in place, the rivets being thus brought away from the top surface of the seat, where they are liable to wear or otherwise injure the clothing of the rider. Said plate is also provided with forwardly-projecting supporting-flanges $o$ $o$, with a recess, $p$, between. These flanges serve as rigid supports, against which the body can brace in certain methods or stages of riding, while the recess $p$ serves to prevent the plate or springs from bearing upon the terminal bone of the spine, to the rider's discomfort.

Between the plate $n$ and the flexible portion of the seat is inserted suitable padding, $q$, preferably of a very coarse grade of felting. By this the rider is relieved of a too close contact with the metal plate. The front spring, $c$, is carried by a bracket, $r$, fastened to and projecting from the upwardly-bent and flattened portion $s$ of the backbone. Said bracket is provided with bifurcations $t$ $t$, which extend on each side of said flattened portion, and are fastened by means of a bolt or bolts, $u$, or other suitable means. The seat $r'$ of the bracket, which projects from the portion $s$ at a point considerably above the backbone, to bring the spring up close to the line of the flexible portion, may be braced by a leg, $v$, which rests upon the backbone. The said seat is preferably provided with two cylindrical sockets, $v'$, Fig. 5, into which the opposite ends of the front spring are secured. By bringing the seat close to the flexible portion the size of the spring may be considerably reduced and increased stiffness obtained, the arrangement of parts being, in consequence, more compact and sightly.

The spring $c$ is provided with a loop or eye, $c'$, which may be, and preferably is, of one piece with the spring, as in Fig. 7, though it may be of separate pieces, as in Fig. 10. After forming the eye the wire of the spring is bent into coils $c^2$ $c^2$, terminating in backwardly-extending ends $c^3$ $c^3$, which enter the cylindrical sockets $v'$ $v'$, as shown in Fig. 2. Said loop or eye receives a hook, $w$, arranged on the supporting-straps $w'$ $w'$ of the flexible saddle and allows a ready detachment of parts. The eye and hook may be transposed without affecting the invention claimed. Said hook is provided with an eye, $w^3$, through which the straps $w'$ pass, the bar $w^2$ of which is preferably provided with a roller, $w^5$, to secure a greater freedom of movement.

The flexible portion of the saddle may be of any ordinary construction, the one shown being preferred.

I have herein referred more particularly to the seat as resting upon the backbone of a bicycle; but I do not wish to be understood as limiting myself to such a combination, as the seat may be formed upon or secured to other perches or saddle-supports in the bicycle or tricyle without departing from this invention. For example, in that class of bicycles represented by the "Star" bicycle I may secure the seat upon the usual saddle-supporting strap found therein.

I am aware that many changes of construction and arrangement of parts may be made in connection with the other portions of the invention without departing from the scope of the invention. By the construction described the saddle may be removed from the bicycle with great ease and quickness by simply loosening the nut $l$ or its equivalent part, so that the portion $d$ may be turned and the base $h$ released, the whole being accomplished without disturbing the seat $e$. A detachment is effected at the front spring or the fore part of the saddle by simply unhooking the parts. When the saddle is subsequently readjusted, the guides or conformations on the seat cause the base $h$ and the spring and saddle depending thereon for their positions to enter into their relative situations automatically or without any special care in securing the said positions or situations, as will be understood.

Having thus described the invention, what I claim as new, is—

1. In a bicycle, the combination of the saddle, a spring supporting the rear end thereof, said spring having a forwardly-extending base, a seat, $e$, having an abutment, $g$, engaging the forward end of said base, and a suitable plate extending across said base, substantially as and for the purposes set forth.

2. In combination, in a bicycle, the backbone or perch, a saddle-spring having a base, a seat secured to said backbone having suitable abutments or stays on the upper face thereof to engage said base, a cross bar or plate, $j$, and a bolt and nut, independent of the means for holding the seat in place on the perch for holding said cross-bar in position, all said parts being arranged and combined substantially as and for the purposes set forth.

3. In a bicycle, the combination, with the perch-saddle and rear spring, of a seat, $e$, having its upper surface shaped to provide an abutment, $g$, to engage the base of said spring and prevent forward movement, and side stays, $i\ i$, to prevent or limit lateral movement of said base, and a cross bar, portion, or plate, $j$, to extend across said base to prevent or limit the uplifting of said base, all substantially as hereinbefore set forth.

4. In a bicycle, the combination, with a perch and saddle-spring, of a perforated seat, a pivotal bolt, a cross piece or plate, and a nut, said parts being arranged and adapted to operate substantially as herein set forth.

5. In a bicycle, the combination, with the backbone and saddle, of an intervening spring-wire which is doubled at $h$ to form a base, then coiled, as at $h'\ h'$, then extended laterally and forwardly to secure wide bearings, as at $h^4\ h^4$, and at the extremities returned, as at $h^6\ h^6$, substantially as set forth.

6. In a bicycle, the combination, with the backbone having thereon a seat provided with abutments $g\ g$, to prevent backward or forward longitudinal motion, and stays to prevent lateral movement of the spring, of a plate to hold said seat in place, and a spring-wire doubled, as at $h$, coiled, as at $h'$, laterally and forwardly projecting, as at $h^4$, and returned, as at $h^6$, a plate to receive said returned portions, and the flexible portions of the saddle secured to said plate, all said parts being arranged and combined substantially as and for the purposes set forth.

7. In a bicycle, the combination, with the saddle and spring having the backwardly-turned upper ends, of a plate, $n$, provided near the opposite ends with sockets which extend toward the front and rear of said plate to engage the backwardly-turned extremities, substantially as set forth and shown.

8. In a bicycle, the rear plate for a flexible saddle having a depending flange at the rear edge thereof to receive the edges of the flexible portions of said saddle, and forwardly-projecting flanges with a recess between, said parts being arranged and combined substantially as and for the purposes set forth.

9. In a bicycle, the supporting-plate $n$, having forwardly-projecting flanges with a recess between, substantially as and for the purposes set forth.

10. In combination with the flexible portion of the seat of a bicycle and the rear spring thereof, a rear plate seated on said spring, and having forwardly-projecting flanges with a central recess between, substantially as and for the purposes set forth.

11. In combination, in a bicycle, with the flexible portions $b\ w'$, and an eye, $c'$, attached to the frame of the bicycle, a hook having a roller over which the said flexible portion may be drawn, substantially as set forth.

12. In combination with the perch $a$, a seat permanently formed or arranged thereon, a spring having its bearings removably secured on said seat and capable of being adjusted without disturbing said seat, and a flexible saddle carried by said spring, said parts being arranged and combined substantially as set forth.

13. In combination with a suitable perch and a flexible saddle, a permanent seat having a fulcrumal bearing, such as the bearing $g$, and a spring having a base to serve as a lever in producing or giving tension to the saddle, substantially as set forth.

14. In combination with a perch, a seat provided with a fulcrumal bearing, a spring, $h$, having a base, a cross-bar, and a flexible saddle, substantially as set forth.

15. In a bicycle, the combination, with the saddle, of a spring having an elastic block arranged within the coils thereof, substantially as set forth.

16. In a bicycle, the combination, with the flexible saddle, of a spring having a hollow block or box arranged within the coils thereof, substantially as and for the purposes set forth.

17. In a bicycle, the combination, with the backbone or perch and the saddle, of a helical spring having a box provided with an elastic covering arranged in the coils thereof, substantially as and for the purposes set forth.

18. In combination with the backbone and rear saddle-spring, a seat, $e$, grooved longitudinally on the under side to receive said backbone, a clip, $f$, and nuts $f'$, and a plate, $j$, which lies over the base of said spring, a stud, $k$, and nut $l$, all said parts being arranged and combined substantially as and for the purposes set forth.

In testimony that I claim the foregoing I have hereunto set my hand this 19th day of February, 1886.

WARREN L. FISH.

Witnesses:
CHARLES H. PELL,
OSCAR A. MICHEL.